United States Patent
Kuscher

(10) Patent No.: US 9,829,927 B2
(45) Date of Patent: Nov. 28, 2017

(54) LAPTOP COMPUTER WITH COVER ROTATABLY ATTACHED TO BASE THAT ROTATES TO COVER KEYBOARD

(71) Applicant: Google Inc., Mountain View, CA (US)

(72) Inventor: Alexander Friedrich Kuscher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/019,527

(22) Filed: Feb. 9, 2016

(65) Prior Publication Data

US 2017/0227991 A1 Aug. 10, 2017

(51) Int. Cl.
G06F 1/16 (2006.01)
H04W 4/00 (2009.01)
H04B 5/00 (2006.01)
H04B 5/02 (2006.01)

(52) U.S. Cl.
CPC ............ *G06F 1/1656* (2013.01); *G06F 1/169* (2013.01); *G06F 1/1683* (2013.01); *H04B 5/0031* (2013.01); *H04B 5/02* (2013.01); *H04W 4/008* (2013.01)

(58) Field of Classification Search
CPC ...... G06F 1/1656; G06F 1/1683; G06F 1/169; H04B 5/0031; H04B 5/02; H04W 4/008
USPC .. 361/679.1, 679.18, 679.55, 748, 749, 752, 361/760, 761, 781
See application file for complete search history.

(56) References Cited

U.S. PATENT DOCUMENTS

| | | | | |
|---|---|---|---|---|
| 4,926,010 A | * | 5/1990 | Citron | G06F 3/021 178/18.07 |
| 4,937,563 A | * | 6/1990 | Shekita | G06F 1/181 211/26 |
| 5,231,380 A | * | 7/1993 | Logan | G06F 3/021 341/22 |
| 5,287,246 A | * | 2/1994 | Sen | G06F 1/169 361/679.1 |
| 5,341,154 A | * | 8/1994 | Bird | G06F 1/162 345/167 |
| 5,355,357 A | * | 10/1994 | Yamamori | G11B 17/046 361/679.01 |
| 5,490,036 A | * | 2/1996 | Lin | G06F 1/1616 361/679.11 |

(Continued)

FOREIGN PATENT DOCUMENTS

| CN | 101776938 A | 7/2010 |
|---|---|---|
| CN | 102135787 A | 7/2011 |

OTHER PUBLICATIONS

Office Action for GB Application No. GB1621595.6, dated Jun. 19, 2017, 9 pages.

*Primary Examiner* — Adrian S Wilson
(74) *Attorney, Agent, or Firm* — Brake Hughes Bellermann LLP

(57) ABSTRACT

A laptop computer may include a lid, a base, and a cover. The base may be attached to the lid at a first end portion of the base. The base may include a keyboard adjacent to the first end portion of the base and an open portion adjacent to a second end portion of the base. The second end portion of the base may be opposite from the first end portion. The cover may be rotatably attached to the base between the keyboard and the open portion. The cover may be configured to swing from a first position covering the open portion of the base to a second position covering the keyboard.

19 Claims, 6 Drawing Sheets

(56) References Cited

U.S. PATENT DOCUMENTS

| | | | | |
|---|---|---|---|---|
| 5,546,334 A * | 8/1996 | Hsieh | G06F 1/1616 | 345/167 |
| 5,629,832 A * | 5/1997 | Sellers | B41J 11/56 | 361/679.11 |
| 5,646,820 A * | 7/1997 | Honda | G06F 1/1616 | 361/679.6 |
| 5,739,810 A * | 4/1998 | Merkel | G06F 1/1616 | 345/156 |
| 5,764,474 A * | 6/1998 | Youens | G06F 1/1616 | 345/169 |
| 5,793,355 A * | 8/1998 | Youens | G06F 1/169 | 345/156 |
| 6,107,990 A * | 8/2000 | Fleming, III | G06F 1/1616 | 345/157 |
| 6,149,001 A | 11/2000 | Akins | | |
| 6,166,722 A * | 12/2000 | Kawabe | G06F 1/1616 | 345/163 |
| 6,262,716 B1 | 7/2001 | Raasch | | |
| 6,392,871 B1 * | 5/2002 | Yanase | G06F 1/162 | 345/905 |
| 6,430,038 B1 * | 8/2002 | Helot | G06F 1/1616 | 248/917 |
| 6,593,859 B1 * | 7/2003 | Watanabe | G06F 1/1616 | 341/20 |
| 6,612,668 B2 * | 9/2003 | Doan | G06F 1/1616 | 16/303 |
| 6,700,773 B1 * | 3/2004 | Adriaansen | G06F 1/1618 | 345/156 |
| 6,865,075 B2 * | 3/2005 | Oakley | G06F 1/1618 | 345/173 |
| 7,486,279 B2 * | 2/2009 | Wong | G06F 1/1616 | 345/1.1 |
| 7,894,184 B2 * | 2/2011 | Huang | G06F 1/1616 | 361/679.11 |
| 8,537,541 B2 * | 9/2013 | Zhang | G06F 1/169 | 345/157 |
| 8,624,844 B2 * | 1/2014 | Behar | G06F 1/162 | 345/168 |
| 8,811,024 B2 * | 8/2014 | Wei | G06F 1/169 | 361/679.18 |
| 9,110,638 B2 * | 8/2015 | Yang | G06F 1/1692 | |
| 9,229,486 B2 * | 1/2016 | Matsuoka | G06F 1/1675 | |
| 9,436,229 B2 * | 9/2016 | Yoo | G06F 1/1637 | |
| 2002/0163778 A1 * | 11/2002 | Hazzard | G06F 1/1632 | 361/679.09 |
| 2003/0021086 A1 * | 1/2003 | Landry | G06F 1/1616 | 361/679.27 |
| 2003/0048595 A1 * | 3/2003 | Hsieh | G06F 3/0221 | 361/679.16 |
| 2003/0048596 A1 * | 3/2003 | Hsieh | G06F 3/0221 | 361/679.16 |
| 2003/0142474 A1 * | 7/2003 | Karidis | G06F 1/1681 | 361/679.06 |
| 2004/0027795 A1 | 2/2004 | Lee et al. | | |
| 2004/0100449 A1 * | 5/2004 | Chuang | G06F 1/169 | 345/173 |
| 2005/0280632 A1 * | 12/2005 | Tsan | G06F 1/1616 | 345/158 |
| 2006/0034038 A1 | 2/2006 | Hou | | |
| 2006/0044259 A1 * | 3/2006 | Hotelling | G06F 1/1616 | 345/156 |
| 2006/0082553 A1 * | 4/2006 | Lin | G06F 1/1616 | 345/163 |
| 2006/0214915 A1 | 9/2006 | Hua | | |
| 2008/0266775 A1 * | 10/2008 | Song | G06F 1/1616 | 361/679.22 |
| 2009/0154085 A1 * | 6/2009 | Goto | G06F 1/1616 | 361/679.08 |
| 2010/0277856 A1 * | 11/2010 | Stoltz | G06F 1/1616 | 361/679.06 |
| 2010/0328871 A1 * | 12/2010 | Fan | G06F 1/169 | 361/679.08 |
| 2011/0075336 A1 * | 3/2011 | Chiang | G06F 1/169 | 361/679.02 |
| 2013/0286551 A1 | 10/2013 | Ashcraft et al. | | |
| 2015/0212588 A1 | 7/2015 | Fujioka | | |

* cited by examiner

LAPTOP COMPUTER WITH COVER ROTATABLY ATTACHED TO BASE THAT ROTATES TO COVER KEYBOARD

TECHNICAL FIELD

This description relates to laptop computers.

BACKGROUND

A laptop computer may include a lid with a display. The lid may be rotatably attached to a base with a keyboard. A user may rotate the lid so that the display faces the user and faces away from the base, placing the laptop computer in a tablet position. In this position, the user may inadvertently press on the keyboard on the opposite side of the laptop computer from the display, resulting in an uncomfortable "squishy" feeling.

SUMMARY

According to one general aspect, a laptop computer may include a lid, a base, and a cover. The base may be attached to the lid at a first end portion of the base. The base may include a keyboard adjacent to the first end portion of the base and an open portion adjacent to a second end portion of the base. The second end portion of the base may be opposite from the first end portion. The cover may be rotatably attached to the base between the keyboard and the open portion. The cover may be configured to swing from a first position covering the open portion of the base to a second position covering the keyboard.

According to another general aspect, a laptop computer may include a lid, a base, a hinge, a cover, and at least one wire. The lid may include a display. The base may be attached to the lid. The base may include a keyboard on an outer portion of the base and at least one processor enclosed by a housing of the base. The processor may be coupled to the display and the keyboard. The hinge may be attached to the base. The cover may be attached to the hinge. The cover may be configured to rotate from a first position covering an open portion of the base to a second position covering the keyboard. The cover may include a trackpad configured to process tactile input when the cover is in the first position. The hinge may be disposed between the keyboard and the open portion of the base. The at least one wire may extend from the cover, through the hinge, and into the base. The at least one wire may be configured to transmit electrical signals from the trackpad to the at least one processor.

A laptop computer may include a lid, a base, a hinge, a cover, and at least one wire. The lid may include a display. The base may be hingedly attached to the lid. The base may include a keyboard on an outer portion of the base adjacent to a first end portion of the base at which the base is hingedly attached to the lid, a sensor configured to determine whether a cover is in a first position or a second position, at least one processor coupled to the display, the keyboard, and the sensor, the processor being configured to enable the keyboard and a tactile input device when the cover is in the first position and disable the keyboard and the tactile input device when the cover is in a second position, a housing enclosing the at least one processor and surrounding the keyboard, the housing including an open portion adjacent to a second end portion of the base opposite from the first end portion, the housing defining a first depression within the open portion and a second depression around the keyboard, and at least one magnet configured to secure the cover in a second position covering the keyboard. The hinge may be attached to the base. The cover may be attached to the hinge. The cover may be configured to rotate from the first position covering the open portion of the base to the second position covering the keyboard. The cover may include a trackpad configured to process tactile input when the cover is in the first position. The hinge may be disposed between the keyboard and the open portion of the base. The at least one wire may extend from the cover, through the hinge, and into the base. The at least one wire may be configured to transmit electrical signals from the tactile input device to the at least one processor.

The details of one or more implementations are set forth in the accompanying drawings and the description below. Other features will be apparent from the description and drawings, and from the claims.

DETAILED DESCRIPTION

A laptop computer may include a lid with a display. The lid may be attached to a base with a keyboard. The lid may be rotatably attached to the base by, for example, one or more hinges or magnets. The base may also include a cover rotatably attached to the base near the keyboard. The cover may be rotatably attached to the base by one or more hinges or magnets. The cover may rotate from a first position covering an open portion of the base and to a second position covering the keyboard. In the first position, the cover may present a trackpad and/or tactile input device to a user.

Figure 1A:
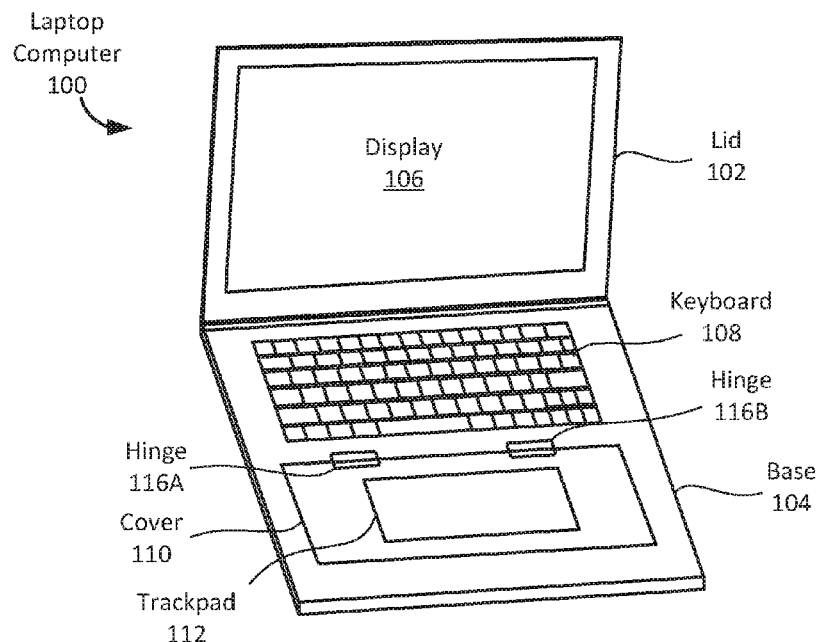
FIG. 1A is a perspective view of a laptop computer with a cover in a first position covering an open portion of a base of the laptop computer.

FIG. 1A is a perspective view of a laptop computer 100 with a cover 110 in a first position covering an open portion (labeled in FIG. 1B) of a base 104 of the laptop computer 100. As shown in FIG. 1A, the laptop computer 100 may include a lid 102 and a base 104. The lid 102 may be rotatably attached to the base 104, and/or the base 104 may be rotatably attached to the lid 102, at a first end portion (labeled in FIG. 2) of the base 104. The rotatable attachment between the lid 102 and the base 104 may allow the lid 102 to rotate three hundred sixty degrees (360°) with respect to the base 104 from a first, closed position, in which a display 106 of the lid 102 faces a keyboard 108 of the base 104 to a second, tablet position, in which the display 106 and keyboard 108 are facing in opposite directions.

The lid 102 may include a display 106. The display 106 may present graphical output to a user. The display 106 may include a touchscreen which also receives tactile input and/or touch input from the user. The display 106 may be electronically coupled to a processor (not shown in FIG. 1A) in the base 104, enabling the display 106 to send tactile input and/or touch input to the processor, and the processor to send graphical output data to the display 106.

The base 104 may include a keyboard 108. The keyboard 108 may be on an outer portion of the base 104. The keyboard 108 may include alphanumeric keys, other character and/or symbol keys, and/or modifier keys to receive alphanumeric, character, symbol, and/or modified alphanumeric or character input from a user.

The base 104 may include a cover 110. The cover 110 may be rotatably attached to the base 104. In an example embodiment, the cover 110 may be rotatably attached to the base 104 by one or more hinges 116A, 116B. While two hinges 116A, 116B are shown in FIG. 1A, the cover 110 may be rotatably attached to the base 104 by any number of hinges. The cover 110 may also be rotatably attached to the base 104 by other mechanisms, such as one or multiple magnets forming a rotatable, magnetic attachment.

The cover 110 may be rotatably attached to the base 104 between the keyboard 108 and the open portion 118. The location of rotatable attachment, such as by hinge(s) 116A, 116B, may be disposed between the keyboard 108 and open portion of the base 104. The location of rotatable attachment of the cover 110 to the base 104 may be roughly at a center of the base 104 as measured in a direction extending away from the first end portion of the base 104 at which the lid 102 is rotatably attached to the base 104. The location of rotatable attachment of the cover 110 to the base 104 may be, for example, at least one third of the length of the base 104 from the first end portion and no more than two-thirds of the length of the base 104 from the first end portion.

The cover 110 may have a greater width than the keyboard 108, and a greater length than the keyboard 108, resulting in a greater area than the keyboard 108. The greater width, length, and area of the cover 110 than the keyboard 108 may enable the cover 110 to fully cover the keyboard 108 when the cover is in the second position covering the keyboard 108, as shown in FIG. 1C. The cover 110 may be made of a light, rigid material, such as plastic or metal.

The cover 110 may include a trackpad 112, which may also be considered a tactile input device and/or tactile input sensor. The trackpad 112 may face the user and/or face away from the base 104 when the cover 110 is in the first position. The trackpad 112 may receive tactile input from the user, such as from a finger, multiple fingers, a thumb, a palm, or any combination thereof. The trackpad 112 may include capacitive sensors and/or resistive sensors, which may be arranged in a grid, to detect locations and pressures of contacts from the user. The trackpad 112 may process the input and may pass the input to the processor in the form of taps, clicks, drags, and/or directional input, which may be similar to mouse input.

Figure 1B:
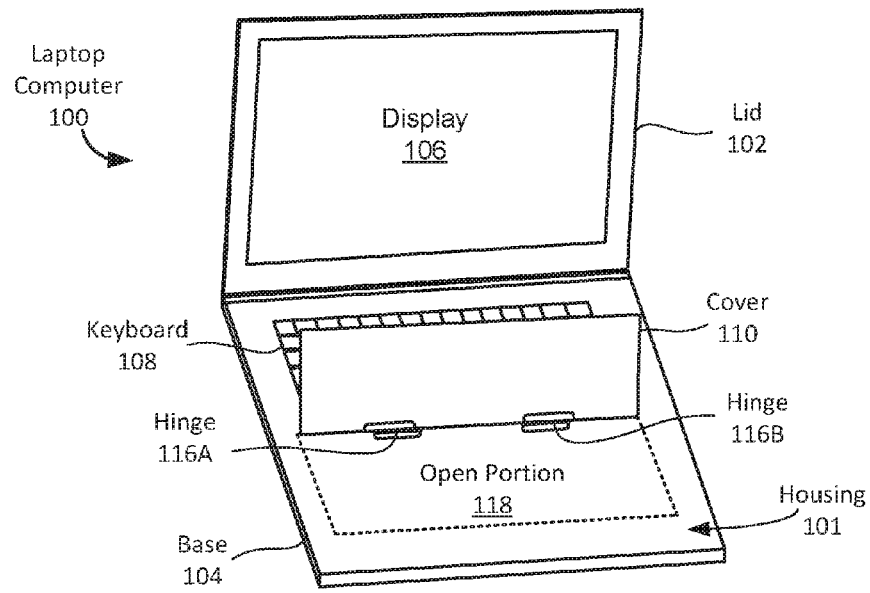
FIG. 1B is a perspective view of the laptop computer of FIG. 1A with the cover in an upright position.
Figure 1C:
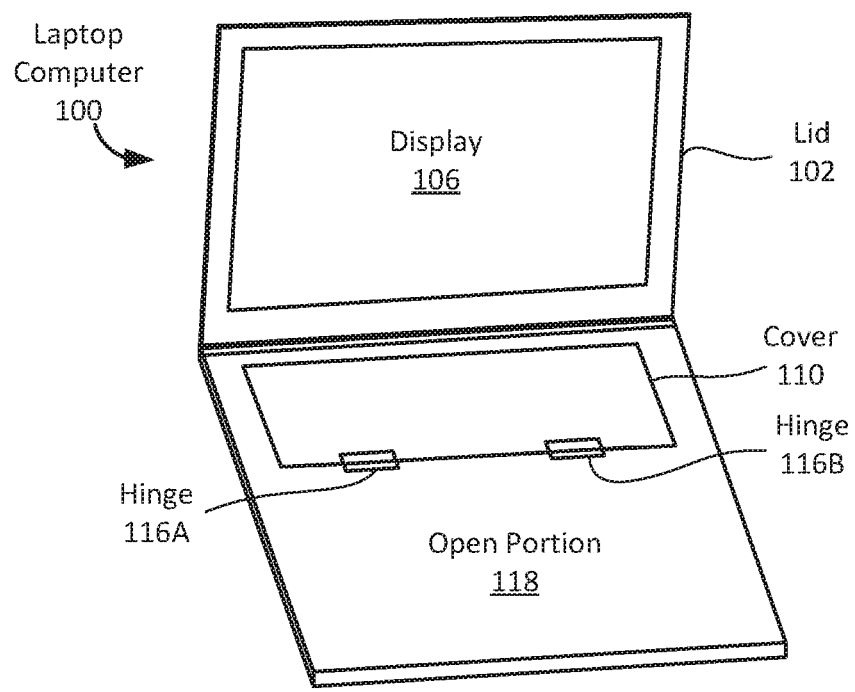
FIG. 1C is a perspective view of the laptop computer of FIGS. 1A and 1B with the cover in a second position covering a keyboard.
Figure 1D:
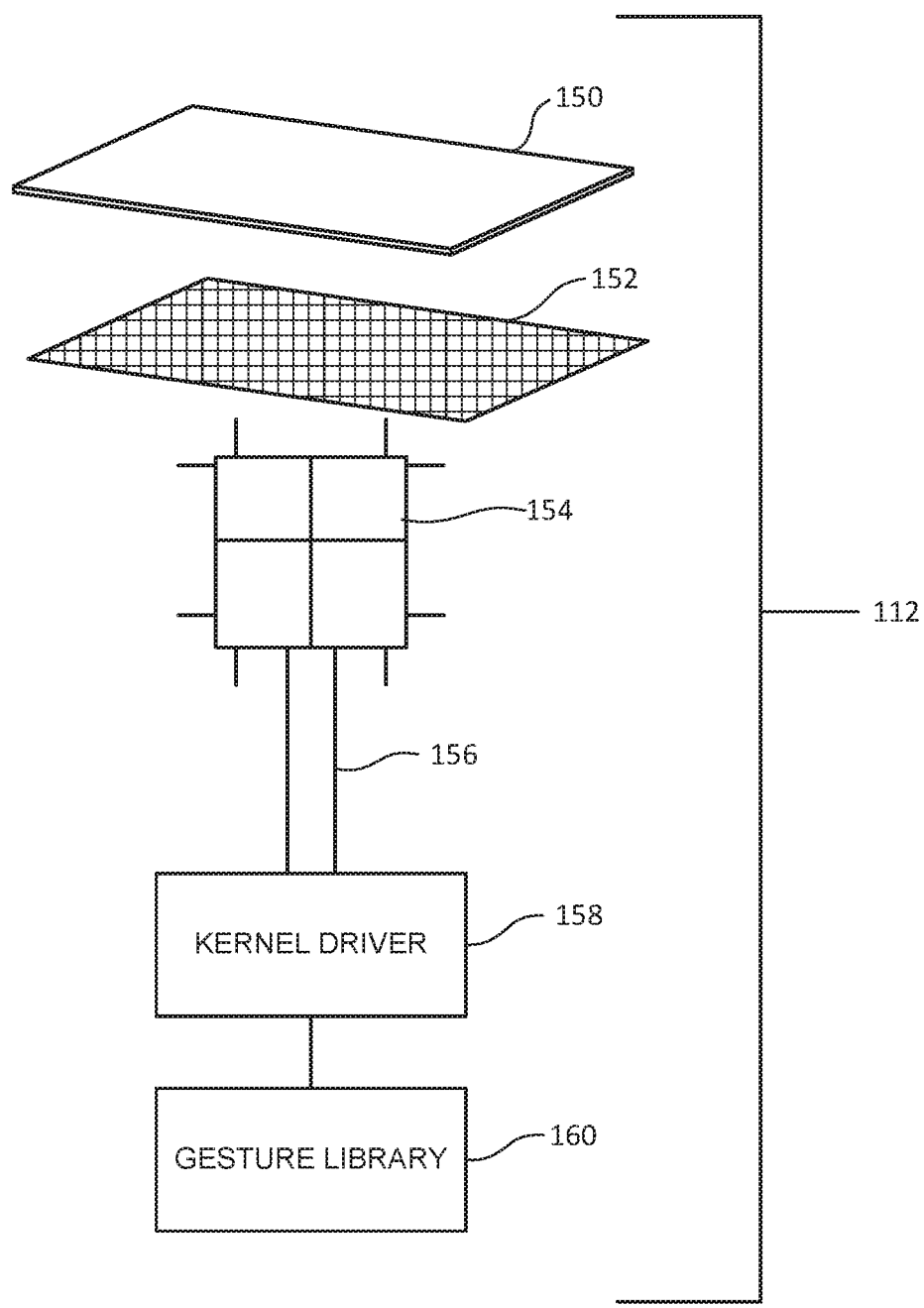
FIG. 1D shows a trackpad included in the cover according to an example embodiment.

FIG. 1D shows the trackpad 112 included in the cover 110 according to an example embodiment. In an example embodiment, the trackpad 112 can include a sensor 152 and a top surface 150, configured to receive inputs (e.g., a touch, swipe, scroll, drag, click, hold, tap, combination of inputs, etc.) from a user. The sensor 152 can be activated when a user enters an input on the top surface 150 of the trackpad 112, and can communicate electronic signals within the laptop computer 100. The sensor 152 can be, for example, a flame-retardant class-4 (FR4) printed circuit board. Other components, such as a dome switch, adhesive sheets, and cables (not shown), may also be integrated in laptop computer 100 to process input by a user via trackpad 112 or keyboard 108. Various elements shown in the display 106 of the laptop computer 100 may be updated based on various movements of contacts on the trackpad 112 or the keyboard 108.

The components of the input devices (e.g., 110, 108) described here can be formed with a variety of different materials such as plastic, metal, glass, ceramic, etc. used for such components. For example, the top surface 150 of the trackpad 112 and base 104 can each be formed, at least in part, with an insulating material and/or conductive material such as a stainless steel material, for example, SUS301 or SUS304.

In an example implementation, the trackpad 112 may include the top surface 150, the sensor 152, a controller 154, a bus 156, a kernel driver 158, and a gesture library 160. The top surface 150 may be configured to be contacted by a user to actuate and trigger an electrical response within the laptop computer 100. The surface 150 may, for example, be on top of the trackpad 112 and above the sensor 152, parallel and flush or nearly flush with other components of the laptop computer 100, such as a top surface of the housing 101 of the base 104 beyond a depressed area 218 (described below). The surface 150 may be operably coupled to the sensor 152. The sensor 152 can be activated when a user enters an input (e.g., a touch, swipe, or a click), such as by applying pressure on the top surface 150 of the trackpad 112. The sensor 152 can be, for example, a flame-retardant class-4 (FR4) printed circuit board. The sensor 152 may be responsive to applications of pressure on the surface 150 and/or sensor 152, and may provide signals to a controller 154 indicating changes in resistance and/or capacitance in the sensor 152 based on the applications of pressure.

The controller 154 may be operably coupled to sensor 152. The controller 154 may be an embedded microcontroller chip and may include, for example, read-only firmware. The controller 154 may include a single integrated circuit containing a processor core, memory, and programmable input/output peripherals. The bus 156 may be a PS/2, I2C, SPI, WSB, or other bus. The bus 156 may be operably coupled to the controller 154 and may communicate with a kernel driver 158. The kernel driver 158 may include firmware and may also include and/or communicate with a gesture library 160. The gesture library 160 may include executable code, data types, functions, and other files (such as JAVASCRIPT files) which may be used to process input to the trackpad 112 (such as multitouch gestures). The gesture library 160, in combination with the kernel driver 158, the bus 156, the controller 154, the sensor 152, and the surface 150, may be used to implement various processes, such as the processes described herein.

The components of the trackpad 112, and their interrelationships, as described above, are merely an example. Functionalities of the gesture library 160 may be performed by the kernel driver 158 and/or controller 154, an operating system or application running on the laptop computer 100. The functionalities may, for example, be stored and/or included on a non-transitory computer-readable storage medium comprising instructions stored thereon that, when executed by a processor or controller of the laptop computer 100, are configured to cause the laptop computer 100 to perform any combination of the functionalities or processes described herein. Or, the trackpad 112 may be designed as an application specific integrated circuit (ASIC) to perform the functions described herein.

FIG. 1B is a perspective view of the laptop computer 100 of FIG. 1A with the cover 110 in an upright position. In this example, the cover 110 has rotated away from the open portion 118 of the base 104 and toward the keyboard 108. The cover 110 has rotated away from the open portion 118 via the hinge(s) 116A, 116B or other mechanism(s) of rotatable attachment. With the cover 110 in the upright position, both the open portion 118 and the keyboard 108 are exposed.

The base 104 may include a housing 101. The housing 101 may enclose portions of the laptop computer 100 and/or base 104, such as at least one processor, a memory device, and/or a battery or other power source. The housing 101 may also surround the keyboard 108.

FIG. 1C is a perspective view of the laptop computer 100 of FIGS. 1A and 1B with the cover 110 in a second position covering the keyboard 108 (not shown in FIG. 1C). In this example, the cover 110 covers the keyboard 108, preventing a user from depressing keys on the keyboard 108. If the lid 102 is rotated so that a back of the lid 102 (opposite from the display 106) faces a bottom of the base 104 (opposite from the keyboard 108 and open portion 118) to place the laptop computer 100 in a tablet position in which the user interfaces with the display 106, the covering of the keyboard 108 by the cover 110 may prevent the user from inadvertently depressing keys on the keyboard 108, preventing undesired input into the laptop computer 100 and also avoiding a "squishy" feeling when the user depresses the keys while holding the laptop computer 100 like a tablet.

In an example implementation, the cover 110 may function as a trackpad when in the second position shown in FIG. 1C. In an example implementation, the trackpad 112 may include a sensor on both sides of the cover 110, including the side of the cover 110 visible from the perspective of FIG. 1C. In an example implementation, the sensor 152 on the trackpad 112 may detect input from both sides of the cover 110. The user may control the laptop computer using the trackpad 112 on the cover 110 with the cover 110 in the second position shown in FIG. 1C.

Figure 2:
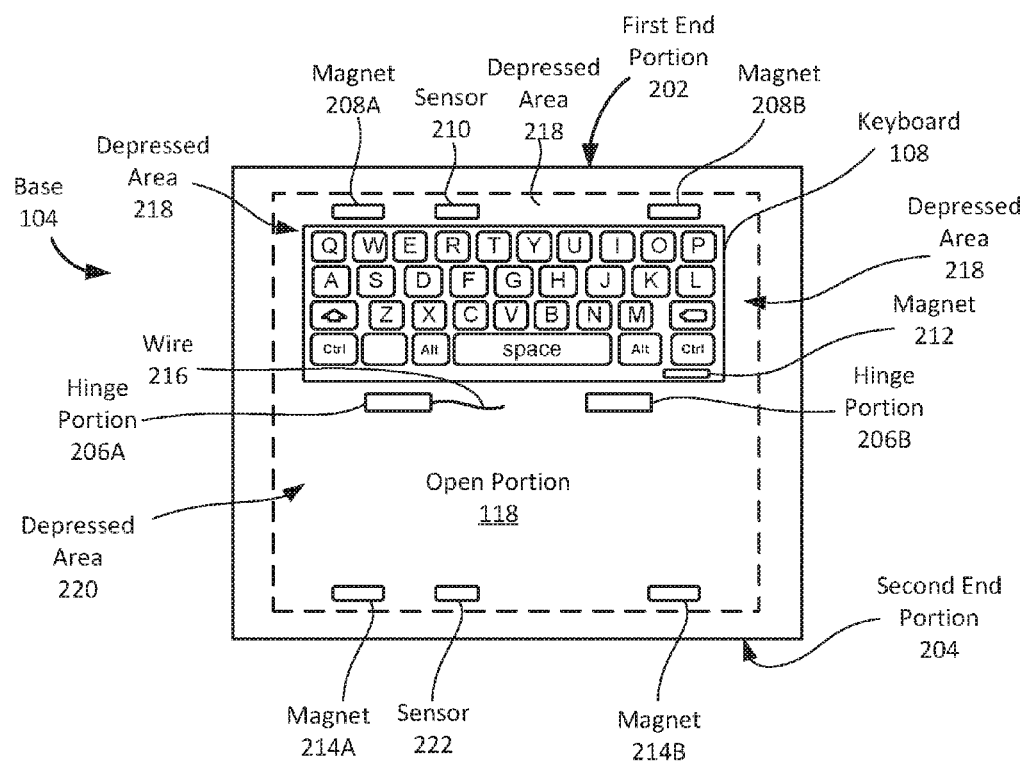
FIG. 2 is a top view of the base of the laptop computer of FIGS. 1A, 1B, and 1C.

FIG. 2 is a top view of the base 104 of the laptop computer 100 of FIGS. 1A, 1B, and 1C. As shown in FIG. 2, the keyboard 108 is closer to a first end portion 202, at which the base 104 is rotatably attached to the lid 102 (not shown in FIG. 2), than to a second end portion 204 opposite from the first end portion 202, of the laptop computer 100, and/or the keyboard 108 may be adjacent to the first end portion 202 of the base 104.

The base 104 may include a depressed area 218 surrounding and/or around the keyboard 108. The depressed area 218, and/or second depression, may be defined by the housing 101. The depressed area 218 may receive the cover 110 (not shown in FIG. 2) when the cover 110 is in the second position so that the cover 110 will be flush with surrounding portions of the base 104. The flushness of the cover 110 with the surrounding portions of the base 104 may create a smooth, flat feeling and appearance for the base 104 when the cover 110 is in the second position.

The open portion 118 may also include a depressed area 220. The depressed area 220, and/or first depression, may be defined by the housing 101. The open portion 118 and depressed area 220 may be located between the keyboard 108 and/or hinge portions 206A, 206B and the second end portion 204. The depressed area 220 may receive the cover 110 when the cover 110 is in the first position so that the cover 110 will be flush with surrounding portions of the base 104.

The base 104 may include one or more hinge portions 206A, 206B. The hinge portions 206A, 206B may mechanically couple to hinge portions 310A, 310B (shown in FIG. 3) of the cover 110 to form the hinge 116A, 116B that allows the cover 110 to rotate, swing, and/or swivel with respect to the base 104 from the first position covering the open portion 118 of the base 104 to the second position covering the keyboard 108.

The base 104 may include one or more wires 216 extending from inside the base 104 through one or more of the hinge portions 206A, 206B into the cover 110. The one or more wires 216 may carry electrical signals, such as tactile input signals, from the trackpad 112 (not shown in FIG. 2) to the processor.

The base 104 may include one or more base magnets 214A, 214B in the open portion 118. While two magnets 214A, 214B are shown in FIG. 2, any number of magnets may be included in the open portion 118 of the base 104. One or more of the magnets 214A, 214B may be located at an end portion of the open portion 118 that is adjacent to the second end portion 204 of the base 104. The magnets 214A, 214B may secure the cover 110 in the first position, such as by attracting magnets in the cover 110, so that the cover 110 does not fall or swing away from the base 104.

The base 104 may include one or more sensors 222 in the open portion 118. The sensor(s) 222 in the open portion 118 may detect whether the cover 110 is in the first position covering the open portion 118, or the cover 110 is in the second position covering the keyboard 108. The sensor(s) 222 may be coupled to the processor and send a signal to the processor indicating whether the cover 110 is in the first position or the second position.

The sensor(s) 222 in the open portion 118 may detect whether the cover 110 is in the first position covering the open portion 118 by, for example, detecting proximity of one or more magnets included in the cover 110, detecting mechanical pressure from the cover 110, and/or by detecting engagement of a latch by the cover 110. The sensor(s) 222 may send a signal to the processor indicating whether the cover 110 is in the first position. The laptop computer 100 may enable and/or disable the trackpad 112 and/or keyboard 108 based on whether the cover 110 is in the first position covering the open portion 118. The laptop computer 100 may, for example, enable the trackpad 112 and keyboard 108 when the cover 110 is in the first position covering the open portion 118, and disable the trackpad 112 and keyboard 108 when the cover 110 is in the second position covering the keyboard 108.

The base 104 may include one or more base magnets 208A, 208B in the depressed area 218 adjacent to and/or surrounding the keyboard 108, and/or one or more magnets 212 in the keyboard 108. While two magnets 208A, 208B are shown in the depressed area 218 and one magnet 212 is shown in the keyboard 108, the base 104 may include any number of magnets in the depressed area 218 and/or keyboard 108. The magnet(s) 208A, 208B, 212 adjacent to and/or surrounding the keyboard 108 and/or in the keyboard 108 may secure the cover 110 in the second position covering the keyboard 108, such as by attracting magnets in the cover 110, preventing the cover 110 from swinging or falling away from the keyboard 108 and/or base 104.

The base 104 may include one or more sensors 210 in the depressed area 218 and/or the keyboard 108. The sensor(s) 210 in the depressed area 218 and/or the keyboard 108 may detect whether the cover 110 is covering the keyboard 108. The sensor(s) 210 in the depressed area 218 and/or the keyboard 108 may detect whether the cover 110 is in the second position covering the keyboard 108 by, for example, detecting proximity of one or more magnets included in the cover 110, detecting mechanical pressure from the cover 110, and/or by detecting engagement of a latch by the cover 110. The sensor(s) 210 may send an electrical signal to the processor indicating whether the cover 110 is in the second position. The laptop computer 100 may enable and/or disable the trackpad 112 and/or keyboard 108 based on whether the cover 110 is in the second position covering the keyboard 108. The laptop computer 100 may, for example, enable the trackpad 112 and keyboard 108 when the cover 110 is in the first position covering the open portion 118, and disable the trackpad 112 and keyboard 108 when the cover 110 is in the second position covering the keyboard 108.

Figure 3:
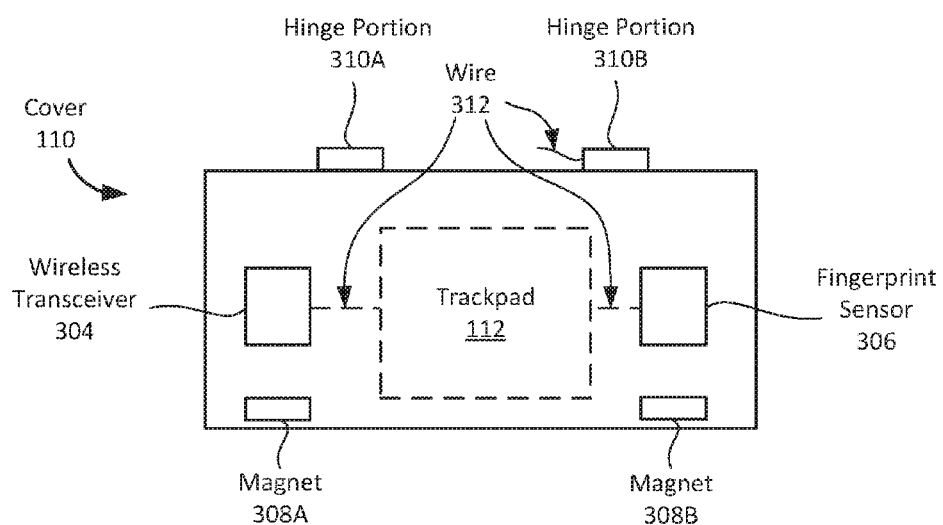
FIG. 3 is a top view of the cover of the laptop computer of FIGS. 1A, 1B, and 1C.

FIG. 3 is a top view of the cover 110 of the laptop computer 100 of FIGS. 1A, 1B, and 1C. The cover 110 may include one or more hinge portions 310A, 310B. The hinge portions 310A, 310B may mechanically couple with the hinge portions 206A, 206B shown and described with respect to FIG. 2 to form the hinge(s) 116A, 116B, allowing the cover 110 to rotate, swing, and/or swivel between the first position and the second position.

The cover 110 may include one or more cover magnets 308A, 308B. While two magnets 308A, 308B are shown in FIG. 3, the cover 110 may include any number of magnets. The magnet(s) 308A, 308B may mate with magnets in the base 104, such as the magnets 208A, 208B, 212, 214A, 214B described above, to secure the cover 110 in the first position and/or second position. The magnet(s) 308A, 308B may also actuate sensors, such as the sensors 210, 222 described above, to indicate whether the cover 110 is in the first position or the second position.

The cover 110 may include one or more wireless transceivers 304. The wireless transceiver 304 may send and receive wireless signals to communicate with a computing device other than the laptop computer 100 when the cover 110 is in the first position covering the open portion 118 of the base 104. The wireless signals may include near field communication (NFC) signals, enabling the cover 110 and laptop computer to communicate with a smartcard or other device that communicates according to the NFC protocol.

The cover 110 may include a fingerprint sensor 306. The finger print sensor 306 may detect and process fingerprint input when the cover 110 is in the first position covering the open portion 118 of the base 104. The fingerprint sensor 306 may enable the laptop computer 100 to identify and/or authenticate a user based on fingerprint recognition.

The cover 110 may include one or more wires 312. The wire(s) 312 may couple the trackpad 112, wireless transceiver 304, and/or fingerprint sensor 306 to the processor of the laptop computer 100. The wire(s) 312 may extend through one or more hinge portions 310A, 310B of the cover 110, and connect to and/or be continuous with the wire 216, which extends through one or more of the hinge portions 206A, 206B of the base 104 and couples with the processor.

Figure 4:
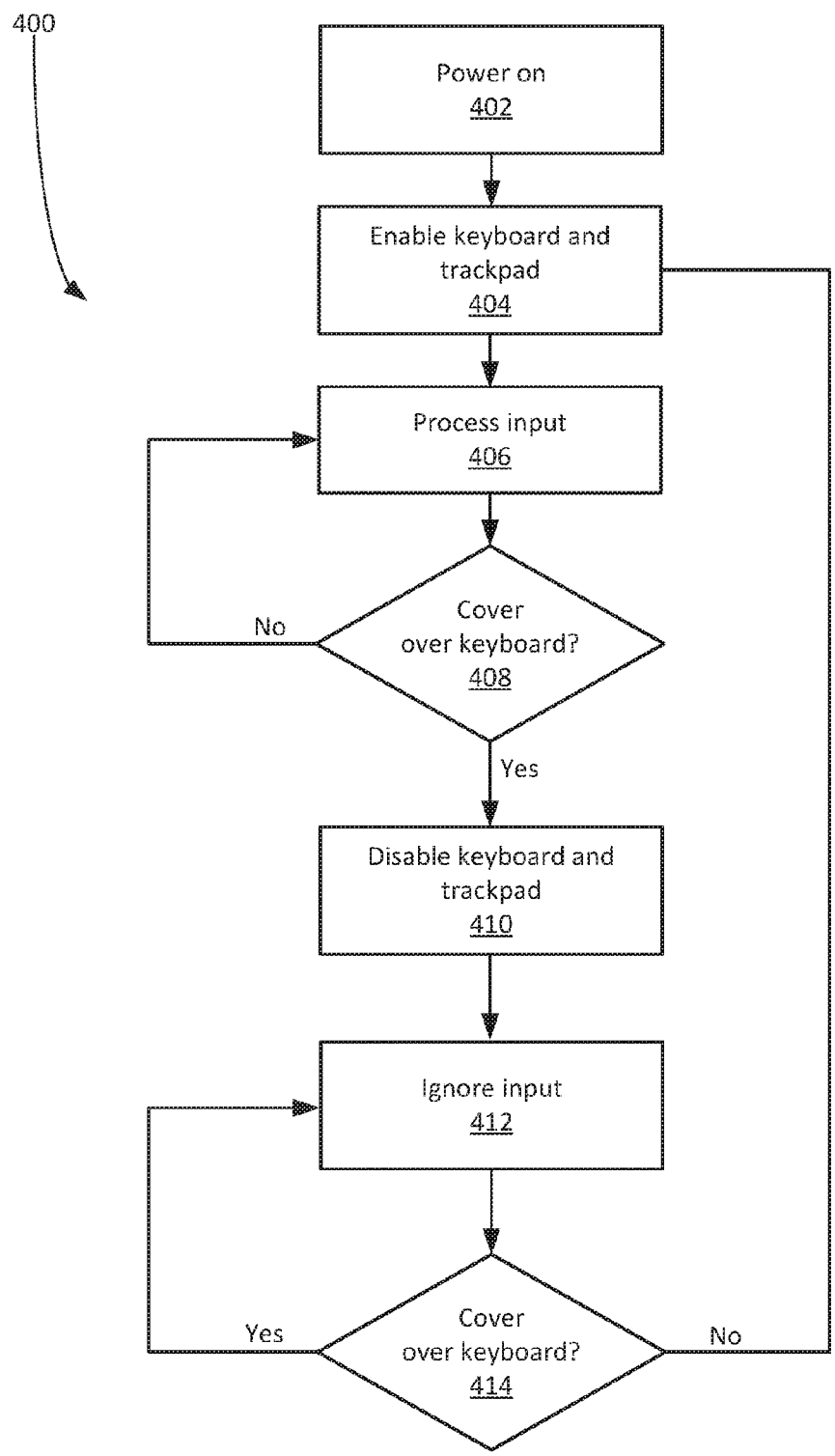
FIG. 4 is a flowchart showing a method performed by the laptop computer of FIGS. 1A, 1B, and 1C.

FIG. 4 is a flowchart showing a method 400 performed by the laptop computer 100 of FIGS. 1A, 1B, and 1C. The method 400 may also be performed by a processor included in the laptop computer 100. The laptop computer 100 may power on (402). The laptop computer 100 may power on (402) in response to user input, such as a user pressing a power button or opening the laptop computer 100.

After powering on (402), the laptop computer 100 may enable the keyboard 108 and trackpad 112 (404). The laptop computer 100 may enable the keyboard 108 and trackpad 112 (404) so that the keyboard 108 and trackpad 112 process input from the user (406).

The laptop computer 100 may determine whether the cover 110 is over the keyboard 108 (408). The laptop computer 100 may determine whether the cover 110 is over the keyboard 108 (408) based, for example, on whether the sensor 210 and/or sensor 222 is actuated. If the cover 110 is not over the keyboard 108, then the laptop computer 100 may continue processing input (406).

If the cover 110 is over the keyboard 108, then the laptop computer 100 may disable the keyboard 108 and trackpad 112 (410). While the keyboard 108 and trackpad 112 are disabled, the laptop computer 100 may ignore input (412) to the keyboard 108 and trackpad 112. The laptop computer 100 may also disable the wireless transceiver 304 and/or fingerprint sensor 306 when the cover 110 is over the keyboard 108.

While the keyboard 108 and trackpad 112 are disabled, the laptop computer 100 may continue monitoring and/or determining whether the cover 110 is over the keyboard 108 (414). If the cover 110 is still over the keyboard 108, then the laptop computer 100 may continue ignoring input (412) to the keyboard 108 and trackpad 112. If the cover 110 is not over the keyboard 108, then the laptop computer 100 may enable the keyboard 108 and trackpad 112 (404).

Figure 5:
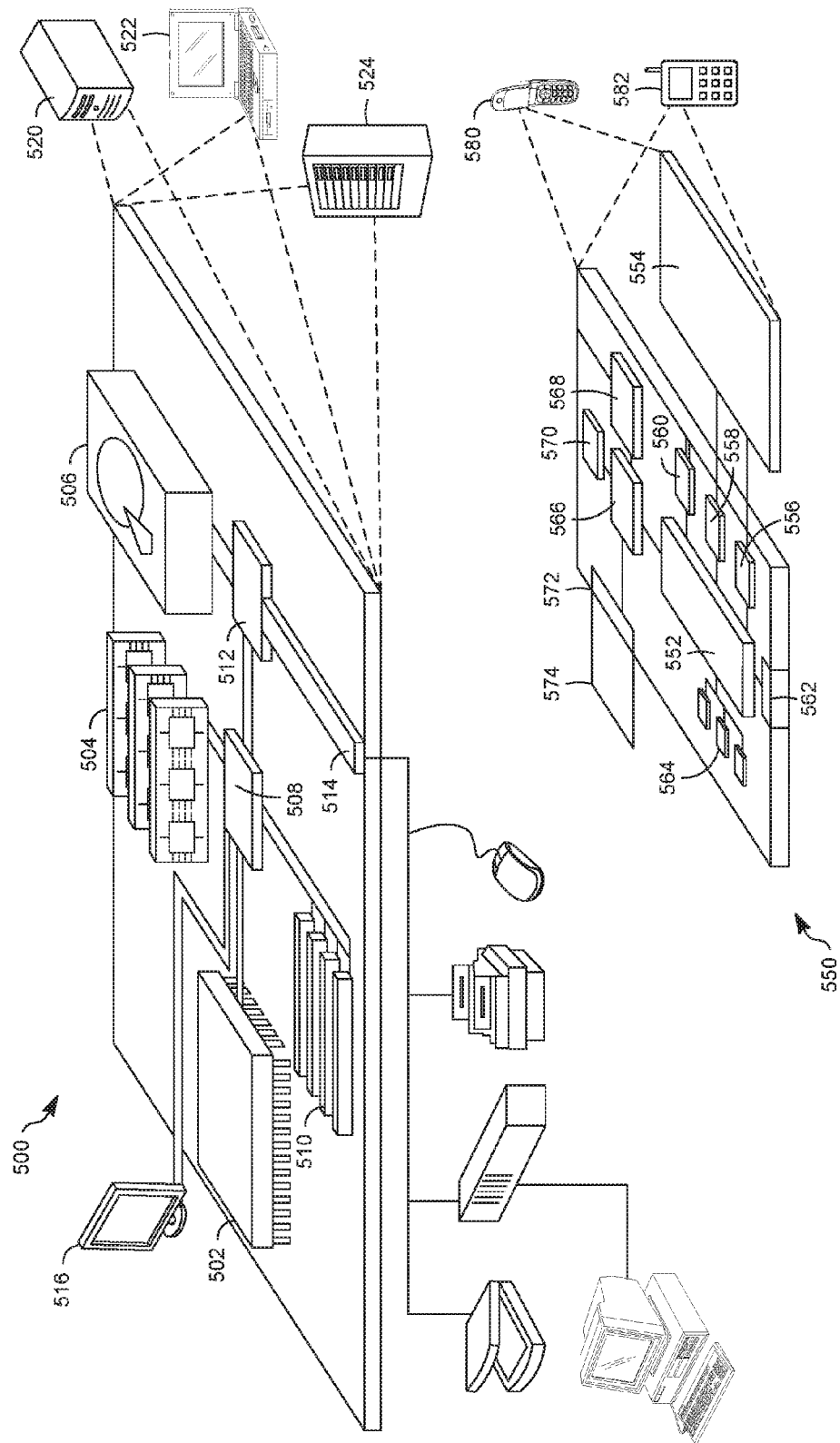
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, tablets, workstations, personal digital assistants, televisions, servers, blade servers, mainframes, and other appropriate computing devices. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. The processor 502 can be a semiconductor-based processor. The memory 504 can be a semiconductor-based memory. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A laptop computer comprising:
   a lid;
   a base attached to the lid at a first end portion of the base, the base comprising:
      a keyboard adjacent to the first end portion of the base;
      an open portion adjacent to a second end portion of the base, the second end portion of the base being opposite from the first end portion; and
      a sensor configured to determine whether a cover is in a first position or a second position, the sensor being coupled to at least one processor, the at least one processor being configured to:
         enable the keyboard when the sensor determines that the cover is in the first position; and
         disable the keyboard when the sensor determines that the cover is in the second position; and
   the cover rotatably attached to the base between the keyboard and the open portion, the cover being configured to swing from the first position covering the open portion of the base to the second position covering the keyboard.

2. The laptop computer of claim 1, wherein the cover comprises a trackpad configured to process tactile input when the cover is in the first position covering the open portion of the base.

3. The laptop computer of claim 1, wherein:
   the cover comprises a trackpad configured to process click and drag inputs when the cover is in the first position covering the open portion of the base; and
   the at least one processor is further configured to:
      enable the trackpad when the sensor determines that the cover is in the first position; and
      disable the trackpad when the sensor determines that the cover is in the second position.

4. The laptop computer of claim 1, wherein the base further comprises the at least one processor.

5. The laptop computer of claim 1, wherein the cover comprises a wireless transceiver configured to wirelessly communicate with a computing device when the cover is in the first position covering the open portion of the base.

6. The laptop computer of claim 1, wherein the cover comprises a near field communication (NFC) module configured to wirelessly communicate with a computing device according to an NFC protocol when the cover is in the first position covering the open portion of the base.

7. The laptop computer of claim 1, wherein the cover comprises a fingerprint sensor configured to process fingerprint input when the cover is in the first position covering the open portion of the base.

8. The laptop computer of claim 1, wherein the cover comprises at least one magnet configured to secure the cover in the second position covering the keyboard.

9. The laptop computer of claim 1, wherein the cover comprises at least one magnet configured to secure the cover in the first position covering the open portion of the base.

10. The laptop computer of claim 1, wherein the base comprises at least one magnet adjacent to the keyboard and configured to secure the cover in the second position covering the keyboard.

11. The laptop computer of claim 1, wherein the keyboard comprises at least one magnet configured to secure the cover in the second position covering the keyboard.

12. The laptop computer of claim 1, wherein the open portion of the base comprises at least one magnet configured to secure the cover in the first position covering the open portion of the base.

13. The laptop computer of claim 1, wherein the base comprises a depressed area around the keyboard so that when the cover is in the second position covering the keyboard, the cover is flush with a portion of the base adjacent to the cover.

14. The laptop computer of claim 1, wherein the open portion comprises a depressed area so that when the cover is in the first position covering the open portion, the cover is flush with a portion of the base adjacent to the cover.

15. The laptop computer of claim 1, further comprising at least one wire coupled to the base and the cover, the at least one wire being configured to transmit electrical signals from the cover to the base.

16. The laptop computer of claim 1, further comprising:
a hinge attaching the cover to the base between the keyboard and the open portion of the base; and
at least one wire extending through the hinge and coupling the cover to the base, the at least one wire being configured to transmit electrical signals from the cover to the base.

17. A laptop computer comprising:
a lid comprising a display;
a base attached to the lid, the base comprising:
   a keyboard on an outer portion of the base;
   a sensor configured to determine whether a cover is in a first position or a second position, the sensor being coupled to at least one processor; and
   at least one processor enclosed by a housing of the base, the at least one processor being coupled to the display and the keyboard, the at least one processor being configured to:
      enable the keyboard and a trackpad when the sensor determines that the cover is in the first position; and
      disable the keyboard and the trackpad when the sensor determines that the cover is in the second position;
a hinge attached to the base;
the cover attached to the hinge, the cover being configured to rotate from the first position covering an open portion of the base to the second position covering the keyboard, the cover comprising the trackpad configured to process tactile input when the cover is in the first position, the hinge being disposed between the keyboard and the open portion of the base; and
at least one wire extending from the cover, through the hinge, and into the base, the at least one wire being configured to transmit electrical signals from the trackpad to the at least one processor.

18. The laptop computer of claim 17, wherein:
the base comprises at least a first base magnet configured to secure the cover in the first position covering the open portion of the base and a second base magnet configured to secure the cover in the second position covering the keyboard; and
the cover comprises at least one cover magnet configured to secure the cover in the first position covering the open portion of the base and the second position covering the keyboard.

19. A laptop computer comprising:
a lid comprising a display;
a base hingedly attached to the lid, the base comprising:
   a keyboard on an outer portion of the base adjacent to a first end portion of the base at which the base is hingedly attached to the lid;
   a sensor configured to determine whether a cover is in a first position or a second position;
   at least one processor coupled to the display, the keyboard, and the sensor, the processor being configured to enable the keyboard and a tactile input device when the cover is in the first position and disable the keyboard and the tactile input device when the cover is in the second position;
   a housing enclosing the at least one processor and surrounding the keyboard, the housing including an open portion adjacent to a second end portion of the base opposite from the first end portion, the housing defining a first depression within the open portion and a second depression around the keyboard; and
   at least one magnet configured to secure the cover in a second position covering the keyboard;
a hinge attached to the base;
a cover attached to the hinge, the cover being configured to rotate from the first position covering the open portion of the base to the second position covering the keyboard, the cover comprising a trackpad configured to process tactile input when the cover is in the first position, the hinge being disposed between the keyboard and the open portion of the base; and
at least one wire extending from the cover, through the hinge, and into the base, the at least one wire being configured to transmit electrical signals from the tactile input device to the at least one processor.

* * * * *